(12) United States Patent
Kato et al.

(10) Patent No.: US 8,128,075 B2
(45) Date of Patent: Mar. 6, 2012

(54) FLUID-FILLED CYLINDRICAL VIBRATION-DAMPING DEVICE

(75) Inventors: Kazuhiko Kato, Komaki (JP); Takashi Kume, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 360 days.

(21) Appl. No.: 12/320,925

(22) Filed: Feb. 9, 2009

(65) Prior Publication Data

US 2009/0200719 A1  Aug. 13, 2009

(30) Foreign Application Priority Data

Feb. 12, 2008  (JP) ................................. 2008-030148

(51) Int. Cl.
 *F16F 5/00*  (2006.01)
(52) U.S. Cl. .................. 267/140.12; 267/141.2
(58) Field of Classification Search ............. 267/140.12, 267/140.11, 140.13, 141.1, 141.2, 141.4; 248/562, 636, 638
See application file for complete search history.

(56) References Cited

U.S. PATENT DOCUMENTS

| | | | | |
|---|---|---|---|---|
| 5,188,346 A | * | 2/1993 | Hamada et al. | 267/140.12 |
| 5,333,847 A | * | 8/1994 | Kanda | 267/140.12 |
| 5,887,844 A | * | 3/1999 | Fujiwara et al. | 267/140.12 |
| 6,168,144 B1 | * | 1/2001 | Bruehl | |
| 6,308,941 B1 | * | 10/2001 | Tsutsumida | 267/140.12 |
| 6,598,863 B2 | * | 7/2003 | Kato | 267/140.12 |

FOREIGN PATENT DOCUMENTS

| | | | |
|---|---|---|---|
| JP | A-1-255736 | * | 10/1989 |
| JP | U-6-25635 | | 4/1994 |
| JP | A-8-61421 | * | 3/1996 |
| JP | A-11-30268 | | 2/1999 |
| JP | B2-3088686 | * | 9/2000 |

OTHER PUBLICATIONS

Nov. 10, 2011 Office Action issued in Japanese Patent Application No. 2008-030148 (with translation).

* cited by examiner

*Primary Examiner* — Pamela Rodriguez
(74) *Attorney, Agent, or Firm* — Oliff & Berridge, PLC

(57) ABSTRACT

A fluid filled cylindrical vibration damping device having a main rubber elastic body elastically connecting an inner shaft member and an intermediate cylindrical member, wherein base wall portions of either of a pair of pocket portions are constituted by the main rubber elastic body to actively rise opposing positive/negative pressure fluctuations in a pair of fluid chambers at times of vibration input across the inner shaft member and the outer cylindrical member; a low-frequency orifice passage and a high-frequency orifice passage are provided; and the high-frequency orifice passage is provided in an aperture section thereof leading to at least one of the pair of fluid chambers with a moveable film adapted to limit fluid flow through the high-frequency orifice passage on the basis of displacement and/or deformation thereof.

8 Claims, 11 Drawing Sheets

FLUID-FILLED CYLINDRICAL VIBRATION-DAMPING DEVICE

INCORPORATED BY REFERENCE

The disclosure of Japanese Patent Application No. 2008-030148 filed on Feb. 12, 2008 including the specification, drawings and abstract is incorporated herein by reference in its entirety.

BACKGROUND OF THE INVENTION

1. Field of the Invention

The present invention relates to a fluid-filled vibration-damping device of tubular design adapted for use as an automotive suspension bushing, for example.

2. Description of the Related Art

Vibration-damping devices has been used to be interposed between components that make up a vibration transmission system for vibration damping linkage between the components. One known vibration-damping device of tubular design includes an inner shaft member, an outer cylindrical member disposed about the inner shaft member, and a main rubber elastic body linking the inner shaft member and the outer cylindrical member mutually. Additionally, fluid-filled cylindrical vibration-damping devices that utilize damping action on the basis of flow of a fluid filling the interior, have widely known and employed as an automotive suspension bushing, for example.

One requirement for a fluid-filled cylindrical vibration-damping device of this kind is that the device exhibit effective vibration-damping action against vibration of each of a number of different frequency ranges. However, the conventional devices encountered the problem that where a low-frequency orifice passage tuned to vibration in a low-frequency range is provided with a view to ensuring satisfactory vibration-damping action on the basis of flow action of fluid induced to flow through the low-frequency orifice passage, vibration-damping ability against vibration in a higher frequency range than that of the low-frequency orifice passage may be diminished appreciably due to antiresonance on the part of the low-frequency orifice passage.

To address this problem, there have been proposed various structures provided with a short circuit channel disposed parallel to the orifice passage, and with an elastic element disposed interrupting the short circuit channel so that the elastic element constitutes a relief mechanism adapted to switch the short circuit channel between an open state and a cutoff state. Examples of such designs include the sealing lip (12, 12') appearing in FIG. 3 of U.S. Pat. No. 6,168,144B1; and the rubber lip piece 9 appearing in FIG. 3 of Japanese Unexamined Patent Publication No. JP-A-01-255736.

However, these relief mechanisms of conventional structure have all been designed such that the elastic element will experience elastic deformation on the basis of a relative pressure differential between two liquid chambers, thereby placing the short circuit channel in the open state. For this reason, in actual practice, operation is inconsistent, making it difficult to consistently achieve the intended vibration-damping performance. Particularly where the elastic element is made of an elastic rubber body, due to the difficulty of ensuring good dimensional accuracy during the molding process as a result of factors such as molding shrinkage and to variation in contact force against the wall of the short circuit channel arising in the diameter-reduction process of the outer sleeve that has been vulcanization-bonded to the outer peripheral face of the main rubber elastic body, it has proven difficult to achieve a relief mechanism that will operate in a reliable manner when acted on by an intended level of pressure.

While it would be conceivable to make it easier beforehand for the elastic element and the wall of the short circuit channel to separate so that the short circuit channel will reliably assume the open state when acted on by an intended level of pressure. This arrangement poses a problem that the elastic element will experience elastic deformation even at very low pressure levels, causing the short circuit channel to open. This makes it difficult to ensure sufficient flow of fluid through the low-frequency orifice passage so that vibration-damping ability against vibration of the low-frequency range to which the low-frequency orifice passage has been tuned is diminished.

SUMMARY OF THE INVENTION

It is therefore one object of this invention to provide a fluid-filled cylindrical vibration-damping device of novel construction adapted to ensure sufficient vibration-damping capability of vibration in a low-frequency range on the basis of fluid flow action through a low-frequency orifice passage between two liquid chambers; while, at times of input of vibration on the higher frequency side of the tuning frequency of the low-frequency orifice passage, capable of avoiding development of very high dynamic spring arising from antiresonance action of the low-frequency orifice passage, so as to afford improved vibration-damping capability.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

Specifically, the present invention provides a fluid-filled cylindrical vibration-damping device including: an intermediate cylinder member disposed about an outer peripheral side of an inner shaft member, while being linked with the inner shaft member by a main rubber elastic body; a pair of pocket portions provided to the main rubber elastic body and situated to either diametrical side of the inner shaft member, while respectively opening onto an outer peripheral face through window portions provided in the intermediate cylinder member; an outer cylindrical member affixed externally onto the intermediate cylinder member while covering the pair of pocket portions thereby defining a pair of fluid chambers filled with a non-compressible fluid; and an orifice member disposed extending in a circumferential direction along an inner peripheral face of the outer cylindrical member to form orifice passages extending in the circumferential direction between the orifice member and the outer cylindrical member, wherein: base wall portions of either of the pair of pocket portions are constituted by the main rubber elastic body so as to actively give rise to opposing positive/negative pressure fluctuations in the pair of fluid chambers at times of vibration input across the inner shaft member and the outer cylindrical member in an axis-perpendicular direction; the orifice passages include a low-frequency orifice passage tuned to a low-frequency range and a high-frequency orifice passage tuned to a high-frequency range; and the high-frequency orifice passage is provided in an aperture section thereof leading to at least one of the pair of fluid chambers with a moveable film adapted to limit fluid flow through the high-frequency orifice passage on the basis of displacement and/or deformation thereof.

In the fluid-filled cylindrical vibration-damping device constructed in accordance with the present invention, during input of low-frequency vibration, excellent vibration-damping action will be produced on the basis of resonance action etc. of fluid induced to flow between the pair of fluid chambers through the low-frequency orifice passage.

Meanwhile, during input of vibration lying on the high-frequency end of the tuning frequency of the low-frequency orifice passage, the low-frequency orifice passage will become substantially obstructed by antiresonance action of the low-frequency orifice passage; and fluid flow will arise through the high-frequency orifice passage between the two fluid chambers on the basis of minute deformations and/or minute displacements of the moveable film which has been disposed in the high-frequency orifice passage in the aperture section leading to at least one of the pair of fluid chambers. In particular, during vibration input along an axis lying in an axis-perpendicular direction coincident with the direction of opposition of the pair of fluid chambers, the pair of fluid chambers will actively give rise to mutually opposite positive and negative pressure fluctuations. For this reason, minute deformations of the moveable film will be produced with good response and efficiency through the action of relative pressure thereon from either side, and as a result both a sufficient level of fluid flow through the high-frequency orifice passage and resonance action on the part of this fluid flow can be produced very effectively. Moreover, excellent vibration-damping capability against high-frequency vibration will be achieved on the basis of the resonance action etc. of the fluid flow.

That is, the present invention provides a novel structure wherein employed in combination are the pair of fluid chambers actively giving rise to mutually opposite positive and negative pressure fluctuations; the low-frequency and high-frequency orifice passages; and a moveable film provided to the aperture section of the high-frequency orifice passage. With this arrangement, the both fluid pressures generated in the pair of fluid chambers act on both sides of the moveable film. That is, in comparison with the conventional device where the fluid pressure will acts on one side of the moveable film, a relatively large external force or pressure, which is enough to sufficiently deform the moveable film, will act on the moveable film from its opposite sides, making it possible to employ the moveable film having a relatively large spring constant, for example. Thus, the present invention can eliminate or reduce the conventional problem such that the vibration damping characteristics becomes unsteady due to dimensional differences or other characteristic differences of the moveable film. In other words, the novel structure of the present invention will ensure a sufficiently large fluid pressure acts on the moveable film, making it possible to compensate somewhat differences in characteristics of the moveable film. Thus, the present fluid filled cylindrical vibration damping device will attain the stable vibration damping action on the basis of the moveable film without needing high sophisticated control of the moveable film in terms of characteristics, quality, dimensions or the like.

In a preferred mode of the fluid-filled cylindrical vibration-damping device constructed in accordance with the present invention, the moveable film is disposed in each of the aperture sections leading from the high-frequency orifice passage to the pair of fluid chambers.

By providing the moveable film disposed in each of the aperture sections leading from the high-frequency orifice passage into the two fluid chambers, it will be possible to more effectively limit escape of pressure between the fluid chambers through the high-frequency orifice passage at times of input of low-frequency vibration. Moreover, through respective adjustment of the deformation characteristics and displacement characteristics of the moveable films, it will be possible to achieve improved freedom in tuning of vibration-damping characteristics. The deformation characteristics and displacement characteristics of the moveable films can be tuned, for example, through appropriate selection of the constituent material, shape, size, or supporting structure of the moveable films, for example.

In other words, the present modes provides further unique structure wherein the pair of fluid chambers generating mutually opposite positive and negative pressure fluctuations, are connected by the low-frequency and high-frequency orifice passages, and moveable films are provided to the both aperture sections of the high-frequency orifice passage to the fluid chambers. This realizes symmetry in a fluid mass flowing through the high-frequency orifice passage including the pair of fluid chambers. Owing to this symmetry, the flows of the fluid will be similarly induced in both directions through the high-frequency orifice passage. Thus, the fluid filled cylindrical vibration damping device of this mode will exhibit no directionality in its vibration damping action.

In addition, the fluid pressures in the pair of fluid chambers will act on the fluid flows through the high-frequency orifice passage via the moveable film at both ends of the high-frequency orifice passage. This arrangement will be effective to regulate the fluid flows through the high-frequency orifice passage, leading to stable and effective vibration damping action based on the fluid flows through the high-frequency orifice passage.

In another mode of the fluid-filled cylindrical vibration-damping device constructed in accordance with the present invention, an integrally vulcanization-molded component that incorporates the inner shaft member and the intermediate cylinder member linked together by the main rubber elastic body is provided with a pair of half orifice bodies respectively having half circular tube shape and assembled from either side with respect to a diametrical axis along which the pair of pocket portions are situated in opposition by assembling the pair of half orifice bodies so as to link the apertures of the pair of pocket portions, thereby defining the orifice member of round tubular shape extending in the circumferential direction along the inner peripheral face of the outer cylindrical member; and slots provided on an outer peripheral face of the orifice member and extending in the circumferential direction are covered by the outer cylindrical member in order to define the low-frequency orifice passage and the high-frequency orifice passage.

By assembling such half orifice bodies of half circular tube shape to define an orifice member of round tubular shape, and forming the low-frequency orifice passage and the high-frequency orifice passage such that these extend along the outer peripheral edge of the orifice member, it becomes possible to efficiently ensure sufficient length of the orifice passages without increasing the size of the device. For this reason, the degree of freedom in design of the orifice passages and in tuning can be improved, and a high-performance fluid-filled cylindrical vibration-damping device that attains the required vibration-damping characteristics can be achieved in a compact design.

In another mode of the fluid-filled cylindrical vibration-damping device constructed in accordance with the present invention, a first lengthwise end of the low-frequency orifice passage opens into and communicates with one of the pair of fluid chambers, while the other lengthwise end of the low-frequency orifice passage opens into and communicates with the other of the pair of fluid chambers; a first medial aperture portion that opens into one of the pair of fluid chambers and a second medial aperture portion that opens into the other of the pair of fluid chambers are formed in a lengthwise medial section of the low-frequency orifice passage, and the moveable films are disposed respectively in the first medial aperture portion and the second medial aperture portion, thereby utilizing a zone that extends between the first medial aperture portion and the second medial aperture portion in the medial section of the low-frequency orifice passage to define the high-frequency orifice passage.

With this arrangement, the apertures of the low-frequency orifice passage and the high-frequency orifice passage will be formed independently, making possible a higher degree of freedom in the design of the low-frequency orifice passage and the high-frequency orifice passage. For this reason, it becomes possible to tune the orifice passages with a high degree of accuracy according to the frequency of the problematic vibration targeted for vibration damping, and to effectively attain the desired vibration-damping capability. According to the present mode in particular, utilizing the lengthwise medial section of the low-frequency orifice passage, the high-frequency orifice passage can be formed by a flow channel shared in common with the low-frequency orifice passage; and moveable films can be disposed in both aperture sections of the high-frequency orifice passage leading to the pair of fluid chambers.

In yet another mode of the fluid-filled cylindrical vibration-damping device constructed in accordance with the present invention, a first lengthwise end of the low-frequency orifice passage opens into and communicates with one of the pair of fluid chambers, while the other lengthwise end of the low-frequency orifice passage opens into and communicates with the other of the pair of fluid chambers; and a medial aperture portion that opens into one of the pair of fluid chambers is formed in the lengthwise medial section of the low-frequency orifice passage, with the moveable film disposed in the medial aperture portion, thereby utilizing the low-frequency orifice passage in part to define the high-frequency orifice passage.

With this arrangement, the aperture leading to one of the fluid chambers from the low-frequency orifice passage and the high-frequency orifice passage can be used in common, whereby the fluid-filled cylindrical vibration-damping device constructed in accordance with the present invention can be realized with simpler construction. Moreover, by establishing the aperture location of the medial aperture portion at an appropriate location in the lengthwise direction of the low-frequency orifice passage, the high-frequency orifice passage can be tuned with sufficient accuracy, making it possible to effectively attain the desired vibration-damping capability.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
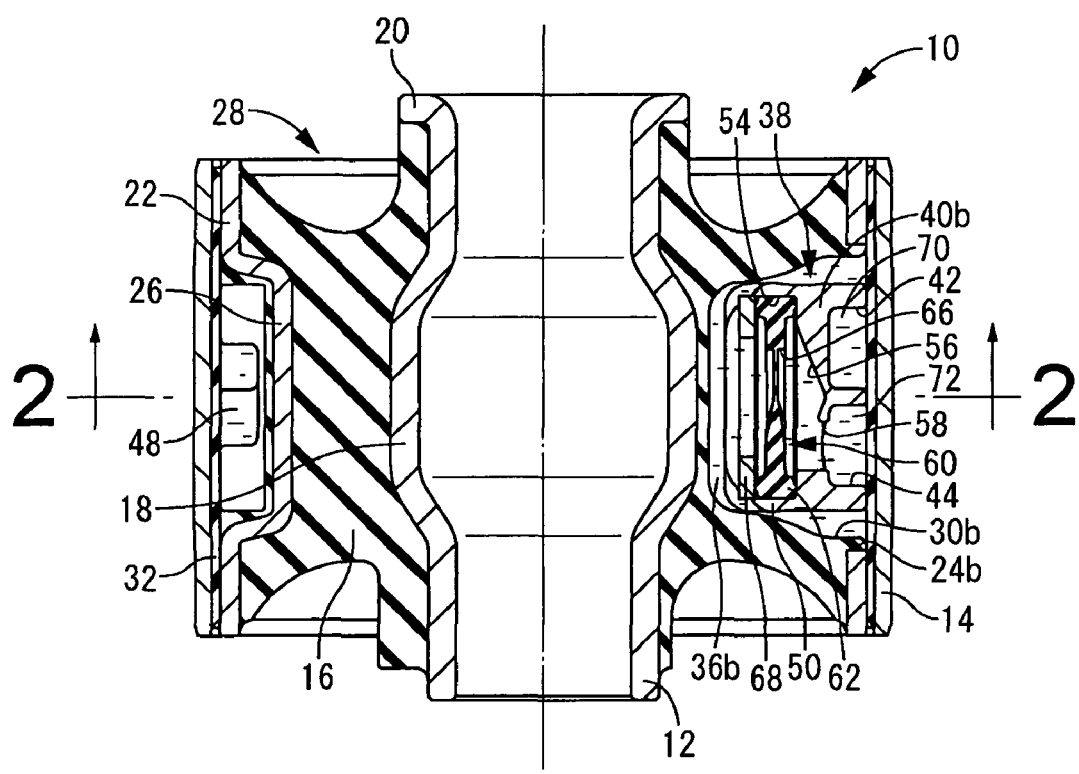
FIG. 1 is an elevational view in axial or vertical cross section of a fluid-filled cylindrical vibration damping device in the form of a suspension bushing according to a first embodiment of the present invention, taken along line 1-1 of FIG. 2.
Figure 2:
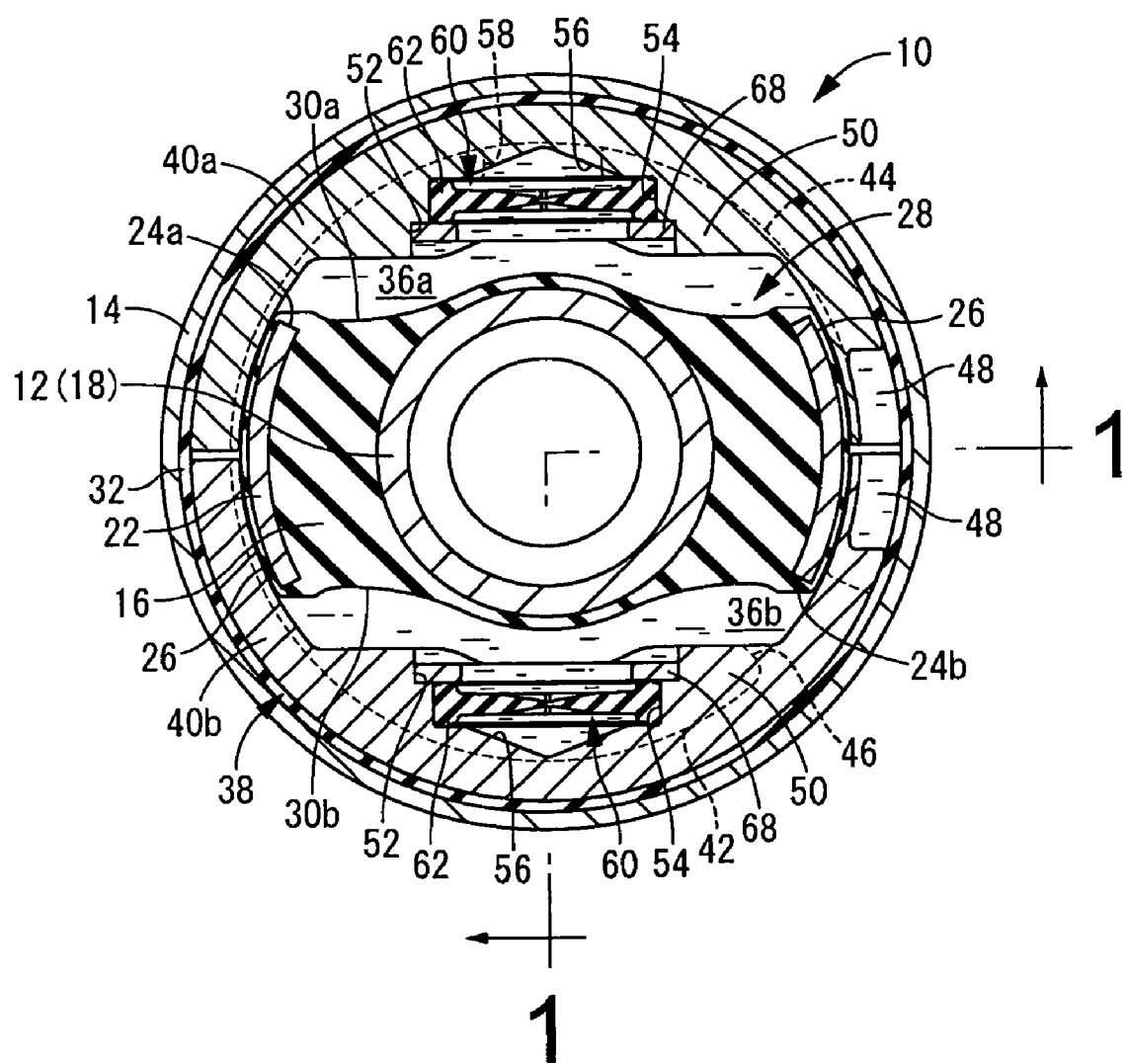
FIG. 2 is a cross sectional view taken along line 2-2 of FIG. 1.

FIGS. 1 and 2 depict a suspension bushing 10 according to a first embodiment of a fluid filled cylindrical vibration damping device constructed in accordance with the present invention. The suspension bushing 10 has a structure in which an inner shaft member 12 of metal and an outer cylindrical member 14 of metal are elastically linked by a main rubber elastic body 16. The inner shaft member 12 is then mounted onto the vehicle body (not shown), while the outer cylindrical member 14 is mounted to a suspension arm (not shown) which is a component situated on the wheel side, and thereby intervene between the vehicle body and the suspension arm to provide vibration-damped linkage of the vehicle body and the suspension arm to one another.

To describe in greater detail, the inner shaft member 12 has a small-diameter, generally round tube shape overall. In the present embodiment, the inner shaft member 12 is a highly rigid member formed of metal material such as iron or aluminum alloy. In the present embodiment, the axial medial section of the inner shaft member 12 defines an expanded diameter portion 18 larger in diameter in comparison with both of the axial end sections. An axially upper end of the inner shaft member 12 constitutes a flanged portion 20 that flares outwardly in the axis-perpendicular direction.

To the outer peripheral side of the inner shaft member 12 is disposed an intermediate cylinder member 22. This intermediate cylinder member 22 has a generally round tube shape that is thin-walled and larger in diameter compared to the inner shaft member 12. The intermediate cylinder member 22 is a highly rigid member formed of metal material similar to the inner shaft member 12. A pair of window portions 24a, 24b are formed in the axial medial section of the intermediate cylinder member 22 so as to be situated in opposition along an axis lying in the diametrical direction. The window portions 24a, 24b pass in the diametrical direction through the intermediate cylinder member 22 and have length so as to extend just short of halfway about the circumference. A pair of slotted portions 26, 26 are formed circumferentially between the pair of window portions 24a, 24b in the intermediate cylinder member 22. The slotted portions 26 are of slot shape opening onto the outer peripheral face in the axial medial section of the intermediate cylinder member 22, and extend in the circumferential direction with their ends communicating respectively with the pair of window portions 24a, 24b.

The inner shaft member 12 and the intermediate cylinder member 22 are positioned coaxially, thereby being situated spaced apart by a prescribed distance in diametrical direction about their entire circumference, with the main rubber elastic body 16 disposed intervening between the inner shaft member 12 and the intermediate cylinder member 22. The main rubber elastic body 16 is formed of a rubber elastic body having thick-walled, generally round tubular shape, both of whose axial end faces are defined by concave faces that slope axially inward towards the intermediate in the diametrical direction.

The main rubber elastic body 16 is arranged with its inner peripheral face juxtaposed against the outer peripheral face of the inner shaft member 12 and vulcanization bonded thereto, and with its outer peripheral face juxtaposed against the inner peripheral of the intermediate cylinder member 22 and vulcanization bonded thereto. The inner shaft member 12 and the intermediate cylinder member 22 are thereby elastically linked to one another by the main rubber elastic body 16. In the present embodiment, the main rubber elastic body 16 takes the form of an integrally vulcanization molded component 28 incorporating the inner shaft member 12 and the intermediate cylinder member 22. Also, in the present embodiment, subsequent to vulcanization molding of the main rubber elastic body 16, the intermediate cylinder member 22 undergoes a diameter reduction process such as 360-degree radial compression to impart preliminary compression in the diametrical direction to the main rubber elastic body 16, thereby reducing the level of tensile stress acting on the main rubber elastic body 16. The inside faces of the slotted portions 26 that have been formed on the intermediate cylinder member 22 are covered entirely by a rubber layer integrally formed with the main rubber elastic body 16.

A pair of pocket portions 30a, 30b are formed in the main rubber elastic body 16 to either side of the inner shaft member 12 along an axis in the diametrical direction. The pocket portions 30a, 30b are of recessed shape opening onto the outer peripheral face in the axial medial section of the main rubber elastic body 16, and as depicted in FIG. 2 have a length so as to extend just short of halfway about the circumference, and correspond in size to the window portions 24a, 24b formed in the intermediate cylinder member 22. The openings of the pocket portions 30a, 30b and the window portions 24a, 24b are aligned, with the pocket portions 30a, 30b communicating with the outer peripheral side of the intermediate cylinder member 22 through the window portions 24a, 24b.

As depicted in FIGS. 1 and 2, the outer cylindrical member 14 is fastened externally fitted onto the integrally vulcanization molded component 28 of the main rubber elastic body 16. The outer cylindrical member 14 has a thin-walled, large-diameter generally round tubular shape and is provided as a rigid member formed of metal material such as iron or aluminum alloy.

Figure 3:
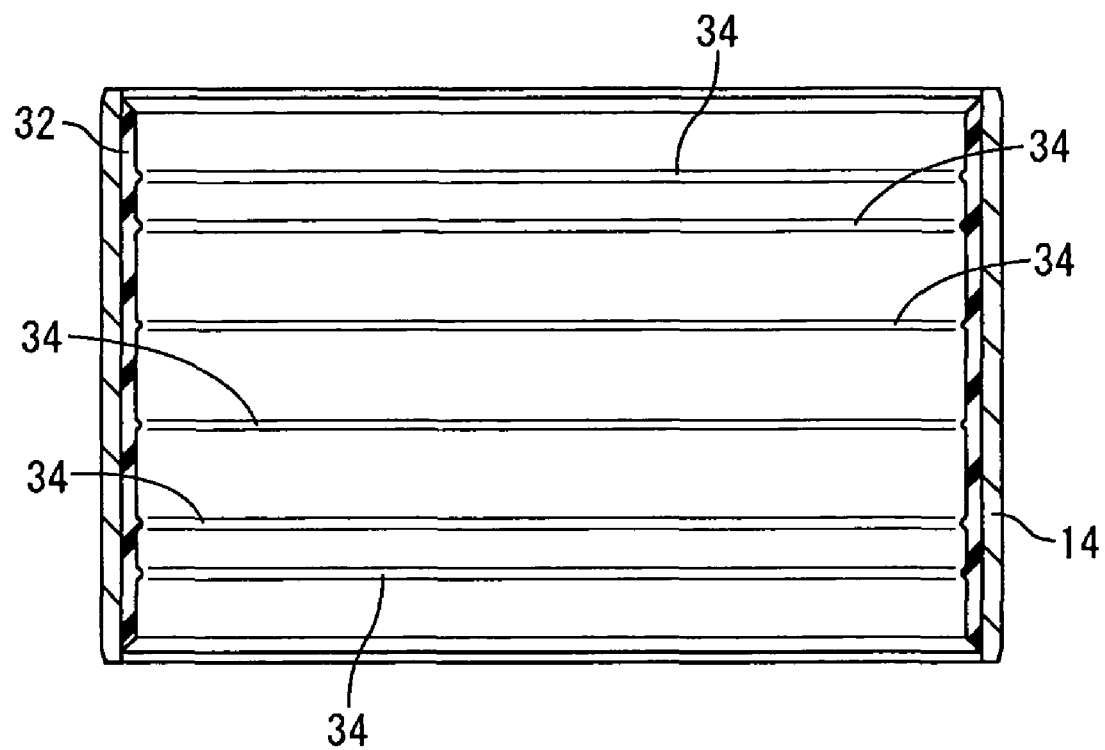
FIG. 3 is an axial or vertical cross sectional view of an outer cylindrical member of the suspension bushing of FIG. 1.

The inner peripheral face of the outer cylindrical member 14 is covered over substantially the entire surface by a seal rubber layer 32. The seal rubber layer 32 is a thin elastic body that sheathes the inner peripheral face of the outer cylindrical member 14. As depicted in FIG. 3, seal ribs 34 that jut towards the inner peripheral side are formed on the seal rubber layer 32. The seal ribs 34 extend continuously about the entire circumference in the circumferential direction. In the present embodiment, a multiplicity of seal ribs 34 are formed spaced apart by prescribed distance in the axial direction. The seal ribs 34 in the present embodiment are formed jutting from the section that will be positioned in contact against the intermediate cylinder member 22 and an orifice member 38, discussed later.

The outer cylindrical member 14 of this construction is fastened externally fitted onto the integrally vulcanization molded component 28 of the main rubber elastic body 16. Specifically, the outer cylindrical member 14 sheathed by the seal rubber layer 32 is slipped onto the outside of the intermediate cylinder member 22 that makes up the integrally vulcanization molded component 28; and the outer cylindrical member 14 is then subjected to a diameter reduction process such as 360-degree radial compression in order to fasten the outer cylindrical member 14 to the outer peripheral face of the intermediate cylinder member 22 in intimate contact against it via the seal rubber layer 32.

Through installation of the outer cylindrical member 14 on the integrally vulcanization molded component 28, the apertures of the pair of window portions 24a, 24b formed in the intermediate cylinder member 22 become covered by the outer cylindrical member 14. The apertures of the pocket portions 30a, 30b which open out through the window portions 24a, 24b are thereby blocked off by the outer cylindrical member 14 to form a pair of fluid chambers 36a, 36b utilizing the pocket portions 30a, 30b. The fluid chambers 36a, 36b are sealed off from the outside by the outer cylindrical member 14 which is juxtaposed fluidtightly against the intermediate cylinder member 22; and a non-compressible fluid is sealed within the fluid chambers 36a, 36b. The fluid chambers 36a, 36b are formed to either side of the inner shaft member 12 in opposition to one another lying along an axis in the diametrical direction coincident with the principal vibration input direction. As depicted in FIG. 2, the pair of fluid chambers 36a, 36b are separated by the axial medial section of the main rubber elastic body 16 which extends in the diametrical direction approximately perpendicular to the direction of opposition of the fluid chambers 36a, 36b.

No particular limitation is imposed on the non-compressible fluid filling the fluid chambers 36a, 36b; water, an alkylene glycol, polyalkylene glycol, silicone oil, or a mixture of these may be favorably employed. In terms of effectively achieving vibration damping based on flow action of the fluid (discussed later), it is especially preferable to use a low-viscosity fluid of 0.1 Pa·s or less as the sealed fluid. Sealing of the non-compressible fluid within the fluid chambers 36a, 36b may be accomplished, for example, by carrying out assembly of the outer cylindrical member 14 to the integrally vulcanization molded component 28 of the main rubber elastic body 16 while these components are immersed in the non-compressible fluid.

The orifice member 38 is positioned in the fluid chambers 36a, 36b. The orifice member 38 is a member of generally round tube shape extending in the circumferential direction along the inner peripheral face of the outer cylindrical member 14, and is positioned so as to straddle the apertures of the pocket portions 30a, 30b in the circumferential direction and fastened to the integrally vulcanization molded component 28 of the main rubber elastic body 16. In the present embodiment, the orifice member 38 incorporates a pair of half orifice bodies 40a, 40b.

As depicted in FIGS. 4 to 8, the half orifice bodies 40 have thick-walled, large-diameter half-circular tube shape overall, and are formed from metal material such as iron or aluminum alloy, or of rigid synthetic resin material. The half orifice bodies 40 will preferably be produced through die casting of iron or aluminum alloy or injection molding of a synthetic resin.

On the outer peripheral edge of the half orifice body 40 there are formed a first slot 42 and a second slot 44 that are provided as slots extending in the circumferential direction on the outer peripheral face; these are formed spaced apart by a prescribed distance in the axial direction. The first slot 42 extends for a length slightly shorter than the total circumferential length of the half orifice body 40, and communicates at a first end thereof with the diametrical inner peripheral side of the half orifice body 40 through a communicating hole 46 that passes through the half orifice body 40 in proximity to a circumferential end, while the other end thereof opens onto a circumferential end face of the half orifice body 40. The second slot 44 extends along the total circumferential length of the half orifice body 40, with its two ends opening onto the respective circumferential end faces of the half orifice body 40. A slope 48 is formed at one of the ends of the second slot 44, and this one end of the second slot 44 gradually slopes towards the first slot 42 going circumferential outward.

The circumferential center section of the half orifice body 40 defines a thick-walled portion 50 that juts diametrically inward. By forming this thick-walled portion 50, the circumferential center section of the half orifice body 40 becomes progressively thicker in the axis-perpendicular direction towards the center in the circumferential direction. The face of the thick-walled portion 50 on its inner peripheral side is of planar shape overall, and the widthwise (circumferential) center section of this face on the inner peripheral side is a bowing face that bows along the circumferential direction of the half orifice body 40.

Figure 6:
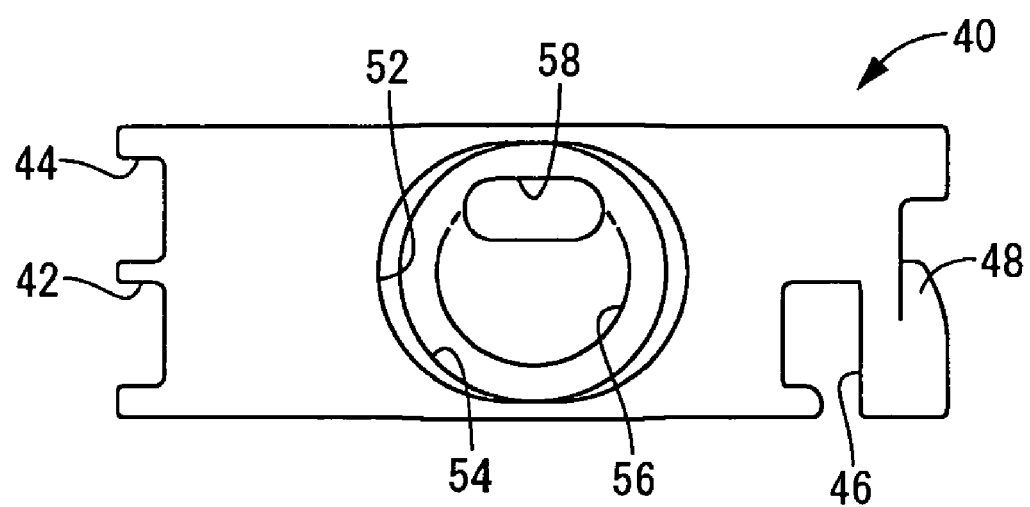
FIG. 6 is a rear elevational view of the orifice member of FIG. 4.
Figure 7:
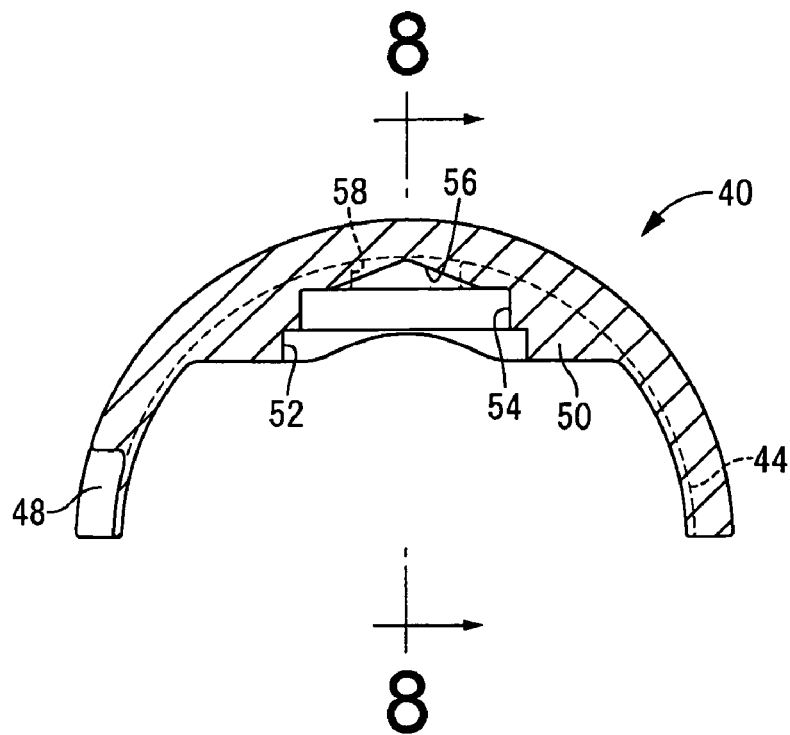
FIG. 7 is a cross sectional view taken along line 7-7 of FIG. 4.

A pressure fitting recess 52 is formed in the center section of the thick-walled portion 50 so as to open onto the face on the inner peripheral side. This pressure fitting recess 52 is a recess having an elliptical cross section as depicted in FIG. 6, and is formed with an unchanging cross section. A housing recess 54 is formed in the diametrical center section of the pressure fitting recess 52. The housing recess 54 is a recess having generally unchanging circular cross section and which opens onto the base wall face of the pressure fitting recess 52. A deformation allowance recess 56 is formed in the diametrical center section of the housing recess 54. The deformation allowance recess 56 is a recess of tapered shape having a circular cross section becoming progressively smaller in diameter towards the bottom side (the outer peripheral side of the half orifice body 40), and is formed so as to open onto the base wall face of the housing recess 54. In the present embodiment, the diameter of the housing recess 54 is approximately equal to the minor axis of the pressure fitting recess 52.

Figure 4:
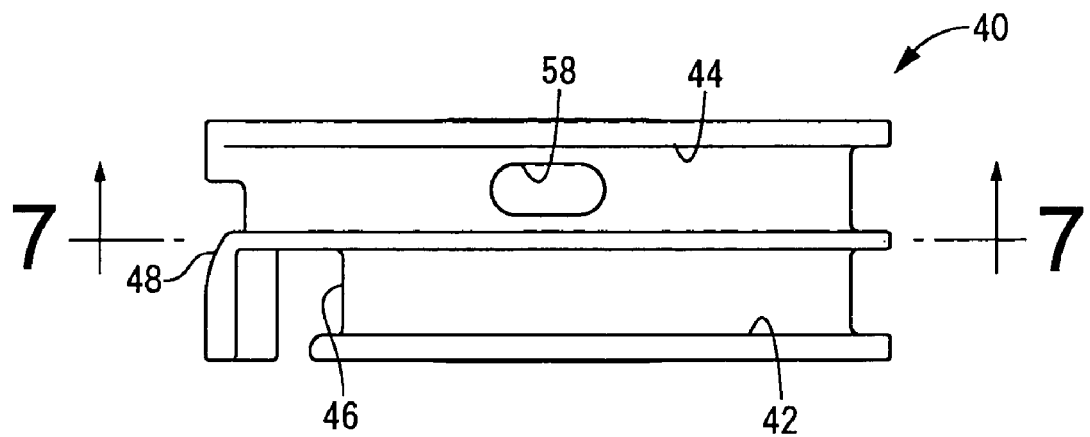
FIG. 4 is a front elevational view of an orifice member of the suspension bushing of FIG. 1.
Figure 5:
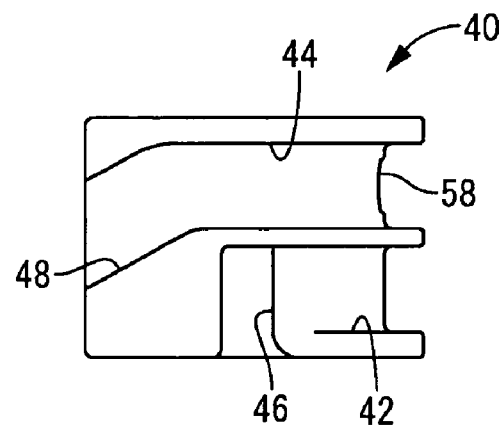
FIG. 5 is a side elevational view of the orifice member of FIG. 4.
Figure 8:
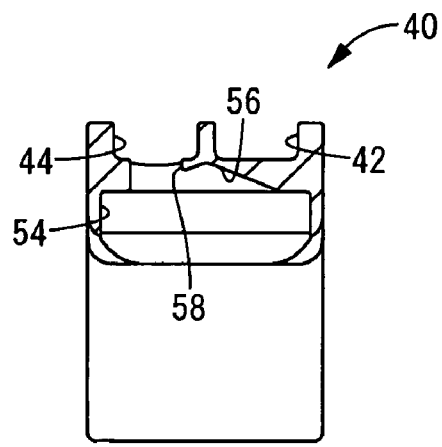
FIG. 8 is a cross sectional view taken along line 8-8 of FIG. 7.

As depicted in FIGS. 4 and 8, an aperture portion 58 is formed in the wall on the inner peripheral side of the second slot 44. The aperture portion 58 is a hole of oval shape that passes in the diametrical direction through the inner peripheral wall of the second slot 44, with a first diametrical end communicating with the lengthwise center section of the second slot 44 and the other end opening onto the base wall of the housing recess 54 to communicate with the housing recess 54.

Figure 9:
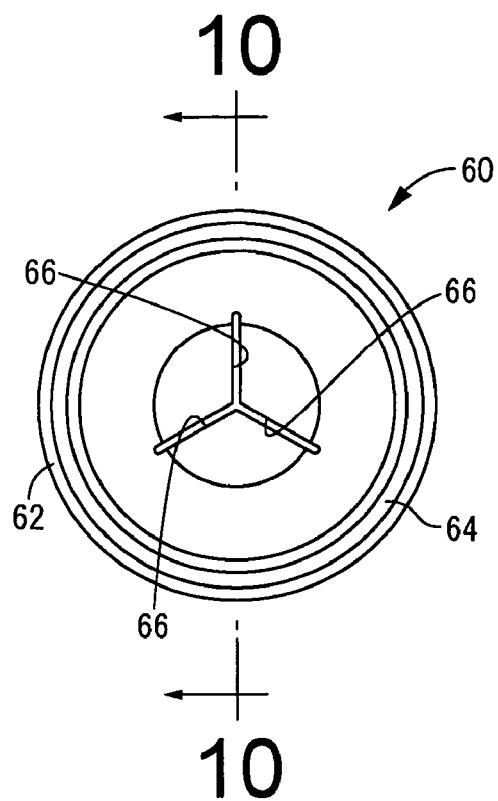
FIG. 9 is a front elevational view of a movable rubber film of the suspension bushing of FIG. 1.
Figure 10:
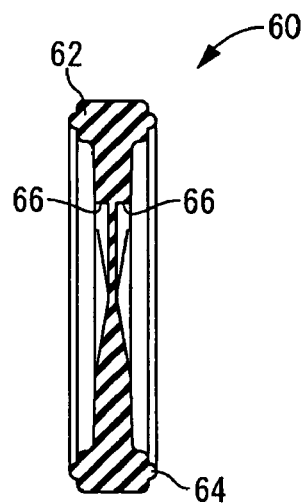
FIG. 10 is a cross sectional view taken along line 10-10 of FIG. 9.

Moveable films 60 like that depicted in FIGS. 9 and 10 will be installed in the half orifice bodies 40 of the above construction. The moveable film 60 is formed by a rubber elastic body of generally circular disk shape corresponding in shape to the housing recess 54. An annular support portion 62 that juts out to either side in the thickness direction is integrally formed on the outer peripheral edge of the moveable film 60. Seal lips 64 are integrally formed along the entire circumference of the diametrical center section of the annular support portion 62, and jut out to either side in the thickness direction. In the present embodiment, the moveable film 60 additionally has a diametrical center section that becomes progressively thinner towards the center. The two faces of the diametrical center section of the moveable film 60 are thereby defined as sloping faces of tapered shape.

The moveable film 60 of the present embodiment has three narrow grooves 66 formed in it. The narrow grooves 66 extend radially from the center to the outer peripheral side in the diametrical direction, with the moveable film 60 being thinner in sections where the narrow grooves 66 are formed than in other sections. As depicted in FIG. 9, in the present embodiment, three narrow grooves 66 are formed in each of the two faces of the moveable film 60, with the narrow grooves 66 on the two faces being formed at mutually corresponding locations as depicted in FIG. 10. In the present embodiment, narrow grooves 66 situated adjacently in the circumferential direction will be formed spaced at equal intervals in the circumferential direction.

By forming these narrow grooves 66 and making the moveable film 60 thinner in parts of its center section, the moveable film 60 will more readily undergo elastic deformation in its center section. Spring of the moveable film 60 will be set appropriately depending on the required vibration-damping characteristics, and can be tuned through appropriate adjustment of the number, length, width etc. of the narrow grooves 66.

The moveable films 60 are then fitted into the housing recesses 54 that were formed in the half orifice bodies 40, and with the moveable films 60 fitted within the housing recesses 54, a fastener fitting 68 of annular shape is pressure-fit into the pressure fitting recess 52. The annular support portion 62 formed on the outer peripheral edge of the moveable film 60 thereby becomes clasped between the fastener fitting 68 and the base wall face of the housing recess 54, with the moveable films 60 installed in the half orifice bodies 40 in a condition whereby elastic deformation of its center section is allowed. In the present embodiment, the deformation allowance recess 56 is formed to the outer peripheral side of the housing recess 54 so as to effectively allow elastic deformation of the diametrical center section of the moveable film 60.

With the moveable film 60 installed in the half orifice body 40, the moveable film 60 is positioned covering the aperture on the liquid chamber 36 side of the aperture portion 58 formed in the half orifice body 40. In particular, due to the seal lip 64 having been integrally formed on the annular support portion 62 and the seal lip 64 being clamped between the housing recess 54 and the fastener fitting 68, the moveable film 60 will be arranged fluidtightly covering the aperture of the deformation allowance recess 56 inclusive of the aperture on the inner peripheral side of the aperture portion 58.

As depicted in FIGS. 1 and 2, the half orifice bodies 40 with the moveable films 60 installed in the above manner will be mounted on the integrally vulcanization molded component 28 of the main rubber elastic body 16. Specifically, as depicted in FIG. 2, the pair of half orifice bodies 40a, 40b are fitted onto the integrally vulcanization molded component 28 from either side in the diametrical direction of opposition of the pair of pocket portions 30a, 30b, and both circumferential ends of the half orifice bodies 40a, 40b are fitted into the pair of slotted portions 26, 26, with the circumferential medial sections of the half orifice bodies 40a, 40b positioned extending so as to straddle in the circumferential direction the apertures of the pocket portions 30a, 30b formed in the main rubber elastic body 16. The assembled half orifice bodies 40a, 40b furnished with the moveable films 60 thereby produce the orifice member 38 having generally round tube shape overall.

Further, the pair of half orifice bodies 40a, 40b are installed flipped with respect to each other in the vertical direction, with the slopes 48 of the respective half orifice bodies 40a, 40b connecting to one another at a first circumferential end, when the half orifice bodies 40a, 40b have been installed in the integrally vulcanization molded component 28. Thus, in the orifice member 38 composed of the pair of half orifice bodies 40a, 40b the slots 42, 44 of the half orifice body 40a will connect in-line with the slots 42, 44 of the half orifice body 40b, and extend in a continuous helical configuration for a length just short of twice around the outside circumferential edge of the orifice member 38 in the circumferential direction. In the present embodiment, in the half orifice body 40a the first slot 42 is formed so as to be situated at the lower side in FIG. 1, while in the half orifice body 40b the first slot 42 is formed so as to be situated at the upper side in FIG. 1.

By fitting and securing the outer cylindrical member 14 to the integrally vulcanization molded component 28 incorporating the installed orifice member 38, the outer peripheral face of the orifice member 38 will be juxtaposed fluidtightly against the inner peripheral face of the outer cylindrical member 14 via the seal rubber layer 32. The apertures at the outer peripheral side of the slots 42, 44 formed in the orifice member 38 will thereby be covered fluidtightly by the outer cylindrical member 14, and utilizing the slots 42, 44 there will be constituted a low-frequency orifice passage 70. The low-frequency orifice passage 70 is a tunnel-like passage that extends in a helical configuration of length just short of twice around the circumference, and communicates at a first end with the liquid chamber 36a through the communicating hole 46 of the half orifice body 40a while communicating at the other end with the liquid chamber 36b through the communicating hole 46 of the half orifice body 40b so that the two fluid chambers 36a, 36b communicate with each other through the low-frequency orifice passage 70. By adjusting the ratio of passage length to passage cross sectional area of the low-frequency orifice passage 70 in consideration of the wall spring rigidity of the fluid chambers 36a, 36b, the passage will be tuned so as to produce vibration damping based on flow action of the fluid, against vibration of a low-frequency range targeted for vibration-damping.

Here, the aperture portions 58, 58 that pass through the wall on the inner peripheral side are formed in the lengthwise medial section of the low-frequency orifice passage 70; and the lengthwise medial section of the low-frequency orifice passage 70 communicates with the fluid chambers 36a, 36b through the aperture portions 58, 58. Utilizing the aperture portions 58, 58 formed in each of the half orifice bodies 40a, 40b, together with part of the low-frequency orifice passage 70 situated between these aperture portions 58, 58, there is constituted a high-frequency orifice passage 72 shorter in passage length than the low-frequency orifice passage 70 and interconnecting the pair of fluid chambers 36a, 36b. The high-frequency orifice passage 72 has a passage cross sectional area approximately equal to that of the low-frequency orifice passage 70 and passage length shorter than the low-frequency orifice passage 70 and equivalent to approximately one-half the circumference; it is tuned so as to exhibit vibration damping based on the resonance action etc. of the fluid, against vibration in a higher frequency range than the low-frequency orifice passage 70.

In the present embodiment, the moveable films 60 are respectively positioned at the aperture sections leading from the high-frequency orifice passage 72 to the pair of fluid chambers 36a, 36b (in other words at the two ends of the high-frequency orifice passage 72), with the aperture portion 58 of each half orifice body 40 covered by the moveable film 60. Through this arrangement, during input of low-frequency vibration, substantial fluid flow through the high-frequency orifice passage 72 will be restricted, while during input of medium- to high-frequency vibration the moveable films 60 will experience elastic deformation produced by relative pressure fluctuations of the fluid chambers 36a, 36b so that the fluid chambers 36a, 36b substantially communicate through the high-frequency orifice passage 72. In the present embodiment, a first medial aperture portion and a second medial aperture portion are constituted by the aperture portions 58, 58 that have been formed in the pair of half orifice bodies 40a, 40b.

With the suspension bushing 10 of construction as described above installed in a vehicle, when vibration is input in the axis-perpendicular direction across the inner shaft member 12 and the outer cylindrical member 14 thus causing the inner shaft member 12 and the outer cylindrical member 14 to undergo relative displacement in the axis-perpendicular direction, relative pressure fluctuations will arise between the pair of fluid chambers 36a, 36b. In particular, at times of input of vibration in the direction of opposition of the pair of fluid chambers 36a, 36b (which coincides with the principal vibration input direction) mutually opposite positive and negative pressure fluctuations will be actively produced in the pair of fluid chambers 36a, 36b.

If the input vibration is vibration in a low-frequency range, on the basis of the relative pressure differential arising between the pair of fluid chambers 36a, 36b, fluid flow will occur between the two chambers 36a, 36b through the low-frequency orifice passage 70. Thus, vibration damping effect (high damping effect) will be produced on the basis of flow action, e.g. resonance action, of the fluid flowing through the low-frequency orifice passage 70.

Also, where vibration of a low-frequency range is input, the amount of elastic deformation of the moveable films 60 will be restricted, and the high-frequency orifice passage 72 will be maintained in a substantially closed off state. Thus, a sufficient flow of fluid between the two chambers 36a, 36b through the low-frequency orifice passage 70 can be efficiently ensured, and the vibration damping effect provided by the low-frequency orifice passage 70 can be advantageously exhibited. When vibration of the frequency range to which the low-frequency orifice passage 70 has been tuned is input, the low-frequency orifice passage 70 will assume the resonance state and there will be an appreciable apparent decline in fluid flow resistance. Fluid flow will be actively generated through the low-frequency orifice passage 70 thereby, and fluid flow through the high-frequency orifice passage 72 will be prevented.

In the present embodiment in particular, the moveable films 60 are installed at the apertures at both ends of the high-frequency orifice passage 72, and at times of input of vibration in a low-frequency range, relative pressure fluctuations between the fluid chambers 36a, 36b can be more effectively prevented from being diminished due to substantial fluid flow through the high-frequency orifice passage 72. As a result, sufficient fluid flow through the low-frequency orifice passage 70 can be assured, and vibration damping effect can be exhibited more efficiently by the low-frequency orifice passage 70.

In the event that the input vibration is vibration of a frequency range higher than the tuning frequency of the low-frequency orifice passage 70, the moveable films 60 will undergo elastic deformation in association with relative pressure fluctuations of the fluid chambers 36a, 36b, whereby the high-frequency orifice passage 72 will assume a substantially open state permitting fluid flow through it, and substantial fluid flow will be produced through the high-frequency orifice passage 72 between the fluid chambers 36a, 36b. The intended vibration damping effect (low dynamic spring effect) will therefore be produced on the basis of flow action of the fluid flowing through the high-frequency orifice passage 72. At times of input of high-frequency vibration, the low-frequency orifice passage 70 will be substantially obstructed by antiresonance action.

In particular, as the walls of each of the two fluid chambers 36a, 36b are defined in part by the main rubber elastic body 16, they function as pressure-receiving chambers that at times of vibration input will give rise to internal pressure fluctuations on the basis of elastic deformation of the main rubber elastic body 16. Furthermore, the pair of fluid chambers 36a, 36b are formed to either side of the main rubber elastic body 16 so as to lie opposite one another in the principal vibration input direction. Consequently, at times of vibration input in the direction of opposition of the pair of fluid chambers 36a, 36b, i.e. the principal vibration input direction, mutually opposite positive and negative pressure fluctuations will be actively produced in the pair of fluid chambers 36a, 36b. For this reason, the relative pressure differential between the pair of fluid chambers 36a, 36b will act upon the moveable films 60 and will effectively and consistently give rise to minute deformations of the moveable films 60. As a result, fluid flow will be effectively produced through the high-frequency orifice passage 72, and excellent vibration damping action of input vibration in a high-frequency range will be attained on the basis of flow action of the fluid.

Figure 11:
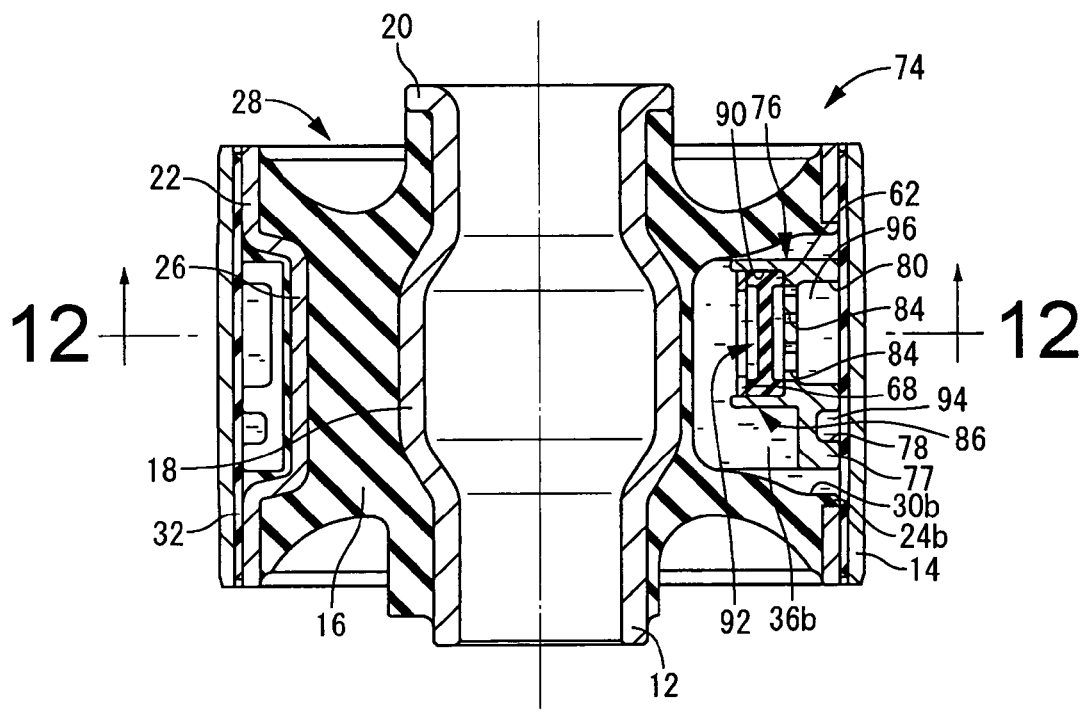
FIG. 11 is an elevational view in axial or vertical cross section of a suspension bushing according to a second embodiment of the present invention, taken along line 11-11 of FIG. 12.
Figure 12:
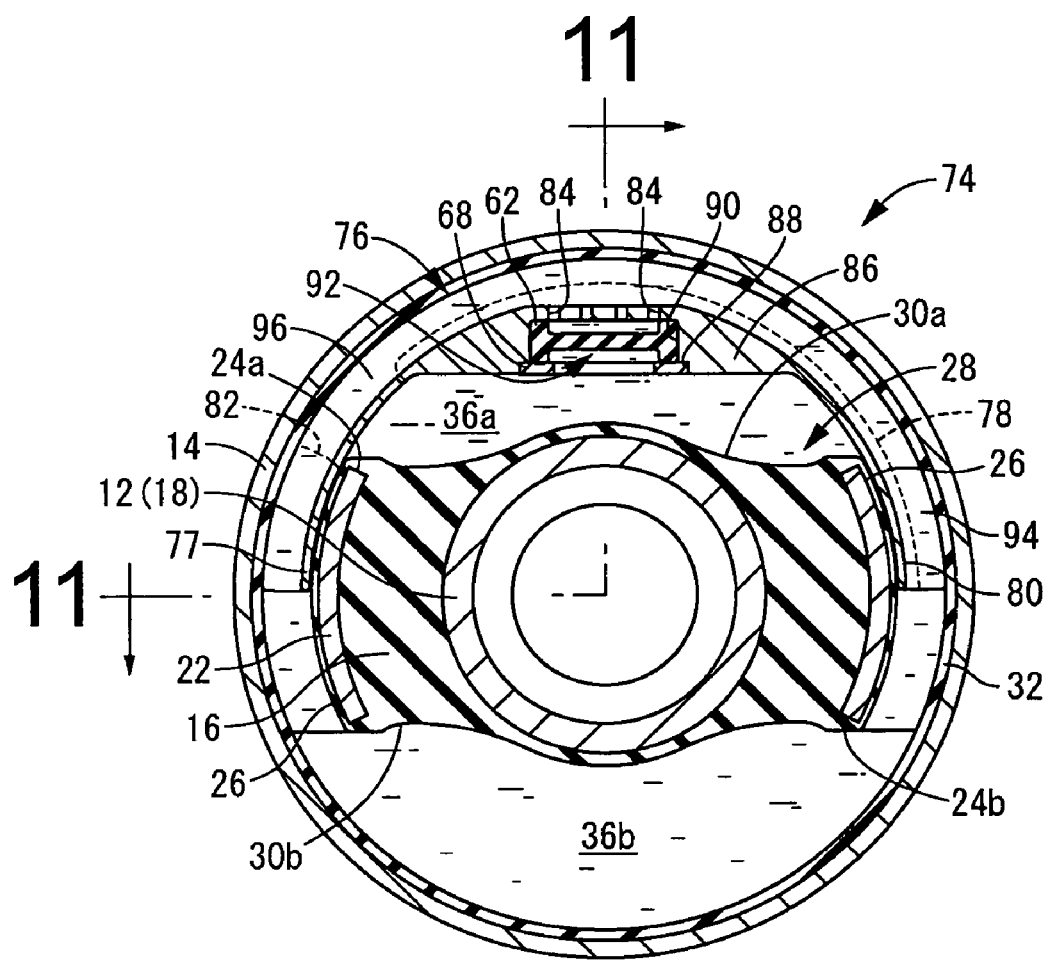
FIG. 12 is a cross sectional view taken along line 12-12 of FIG. 11.

Next, FIGS. 11 and 12 depict an automotive suspension bushing 74 in a second embodiment of a fluid filled cylindrical vibration damping device according to the present invention. In the following description, components and parts that are substantially identical with those in the preceding first embodiment will be assigned like symbols and not described in any detail.

Figure 13:
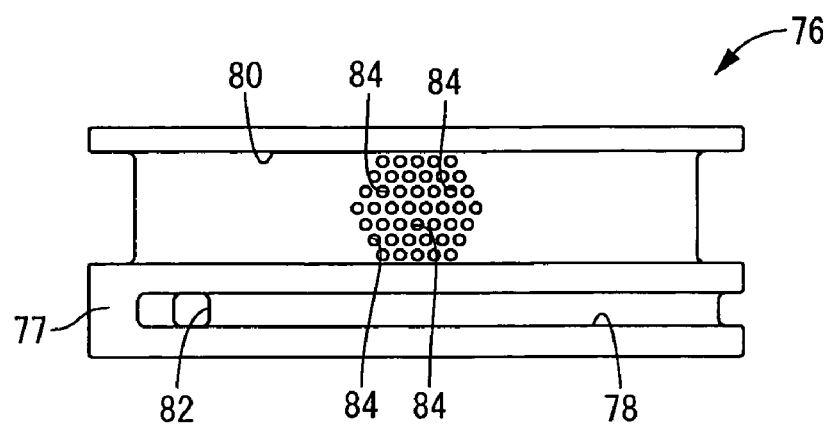
FIG. 13 is a front elevational view of an orifice member of the suspension bushing of FIG. 11.

The suspension bushing 74 has a structure in which an orifice member 76 is installed on an integrally vulcanization molded component 28 of the main rubber elastic body 16 substantially identical in structure to the component in the preceding first embodiment. As depicted in FIGS. 11 to 13, the orifice member 76 has a generally half-circular tube shape overall, and incorporates an orifice fitting 77 made of metal such as iron or aluminum alloy.

As depicted in FIG. 13, on the outer peripheral edge of the orifice fitting 77 there are formed a first slot 78 provided as a slot extending in the circumferential direction for a length slightly shorter than the entire length in the circumferential direction; and a second slot 80 provided as a slot extending continuously in the circumferential direction about the entire length in the circumferential direction, these grooves being formed spaced apart by a prescribed distance in the axial direction. The first slot 78 has approximately the same length as the second slot 80, but is smaller in depth and width than the second slot 80.

At a first circumferential end of the first slot 78 there is formed a communicating hole 82 that passes in the diametrical direction through the base wall (the wall on the inner peripheral side) of the first slot 78; this first end of the first slot 78 communicates with the inner peripheral side of the orifice fitting 77 through the communicating hole 82, while its other end opens onto the circumferential end face of the orifice fitting 77.

In the lengthwise center section of the second slot 80 there are formed aperture portions 84 provided as a medial aperture portion that pass in the diametrical direction through the base wall (the wall on the inner peripheral side) of the second slot 80. In the present embodiment, these aperture portions 84 are small-diameter circular holes, with a multitude of these aperture portions 84 being formed at a prescribed location. The two circumferential ends of the second slot 80 open onto the circumferential end faces of the orifice fitting 77, and the circumferential center section of the second slot 80 communicates with the inner peripheral side of the orifice fitting 77 through the aperture portions 84.

As depicted in FIGS. 11 and 12, a housing portion 86 that projects to the inner peripheral side is formed in the circumferential center section of the orifice fitting 77. This housing portion 86 is formed in the same axial section of the orifice fitting 77 where the second slot 80 is also located. A pressure fitting recess 88 that opens towards the inner peripheral face is formed in the circumferential center section of the housing portion 86. In the center section of the pressure fitting recess 88 there is formed a housing recess 90 that opens onto the base wall of the pressure fitting recess 88. The housing recess 90 is a circular recess whose base wall is perforated by the aperture portions 84.

A moveable film 92 is fitted within the housing recess 90. The moveable film 92 is made of a rubber elastic body of generally circular disk shape having generally unchanging thickness in its center section, and an outer peripheral edge portion that juts out to either side in the axial direction about the entire circumference to define an annular support portion 62. The moveable film 92 is installed fitting within the housing recess 90, and a fastener fitting 68 of annular shape is pressure-fit into the pressure fitting recess 88 so that the annular support portion 62 of the moveable film 92 is installed clasped between it and the base wall of the housing recess 90. The moveable film 92 is thereby attached to the orifice fitting 77 in a condition allowing minute deformations of its center section in the thickness direction; the orifice fitting 77 with the moveable film 92 installed therein constitutes the orifice member 76. The moveable film 92 at a first face thereof will be acted upon by the pressure of the liquid chamber 36a through the center hole of the annular fastener fitting 68, while its other face will be acted upon by the pressure of the liquid chamber 36b through the aperture portions 84.

The orifice member 76 fashioned in the above manner is installed on the integrally vulcanization molded component 28 so as to straddle the aperture of the pocket portion 30a, with both circumferential ends fitted into the pair of slotted portions 26, 26. With the orifice member 76 installed, the outer cylindrical member 14 is secured externally fitting onto the integrally vulcanization molded component 28, thereby completing the suspension bushing 74 of construction according to the present embodiment.

In this suspension bushing 74, the outer peripheral aperture of the first slot 78 is covered by the outer cylindrical member 14, thereby forming a low-frequency orifice passage 94 that extends for a length just short of halfway around the circumference and interconnects the fluid chambers 36a, 36b. Also, the outer peripheral aperture of the second slot 80 is covered by the outer cylindrical member 14, thereby forming a high-frequency orifice passage 96 that extends from the circumferential center section to either side in the circumferential direction for a length equal to approximately one-fourth the circumference. The high-frequency orifice passage 96 communicates with the liquid chamber 36a through the aperture portions 84 formed in its circumferential center section, and communicates with the liquid chamber 36b through apertures at both circumferential ends of the second slot 80. The high-frequency orifice passage 96 has shorter passage length and larger passage cross sectional area as compared with the low-frequency orifice passage 94, and the tuning frequency of the high-frequency orifice passage 96 is a higher frequency than that of the low-frequency orifice passage 94 owing to the different ratio of passage length to passage cross sectional area.

With the suspension bushing 74 of the construction described above installed in a vehicle, during input of vibration in a low-frequency range fluid flow will be produced through the low-frequency orifice passage 94 between the fluid chambers 36a, 36b, and vibration-damping action will be exhibited on the basis of flow action of the fluid. In the present embodiment as well, at times of input of low-frequency vibration the extent of deformation of the moveable film 92 will be limited, preventing any substantial fluid flow through the high-frequency orifice passage 96.

When vibration in a high-frequency range is input, the action of relative pressure fluctuations of the fluid chambers 36a, 36b will actively give rise to elastic deformation of the moveable film 92. On the basis of elastic deformation of the moveable film 92, fluid flow through the high-frequency orifice passage 96 will be allowed, and the high-frequency orifice passage 96 will assume a substantially open state. Active fluid flow will then be produced between the fluid chambers 36a, 36b through the high-frequency orifice passage 96 which has been tuned to vibration of a high-frequency range, and vibration-damping effect will be effectively produced on the basis of flow action of the fluid. The low-frequency orifice passage 94, which has been tuned to a lower frequency than the frequency of the input vibration, will become substantially obstructed due to antiresonance action.

As discussed above, is it possible for the present invention to be adapted to constructions in which the low-frequency orifice passage 94 and the high-frequency orifice passage 96 are independent passages formed in parallel, and the desired excellent vibration-damping effect can be attained by disposing the moveable film 92 in the aperture leading from the high-frequency orifice passage 96 to at least one of the fluid chambers 36a, 36b.

Figure 14:
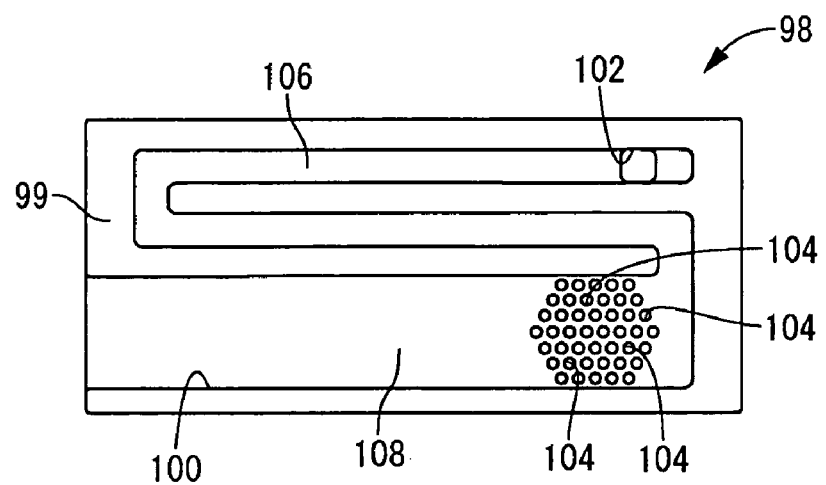
FIG. 14 is a front elevational view of an orifice member used in a suspension bushing according to a third embodiment of the present invention.

FIG. 14 depicts an orifice member 98 adapted for use in an suspension bushing in a third embodiment of a fluid filled cylindrical vibration damping device according to the present invention. Apart from the orifice member 98, the construction of the suspension bushing according to the present embodiment is substantially identical to the constructions of the suspension bushings 10, 74 taught in the preceding first and second embodiments, and need not be described here.

Specifically, like the orifice member 76 shown in the preceding second embodiment, the orifice member 98 includes an orifice fitting 99. In the orifice fitting 99 there is formed a slot 100 opening onto its outer peripheral face and extending for a prescribed distance. As depicted in FIG. 14, the slot 100 extends in the circumferential direction so as to double back in proximity to its ends; a first lengthwise end is situated in proximity to a first circumferential end at the axial upper end of the orifice fitting 99, while the other lengthwise end opens onto the other circumferential end face at the axial lower end of the orifice fitting 99. A communicating hole 102 that extends to the inner peripheral side in the diametrical direction is formed at the first lengthwise end of the slot 100.

In the present embodiment, the slot 100 varies in width in its lengthwise medial section, with the widest section being that extending in the circumferential direction through the lowermost end of the slot 100. Additionally, aperture portions 104 formed in the wide lowermost end of the slot 100 are provided as a medial aperture portion that pass through the wall on the inner peripheral side. While not explicit in the drawing, as in the second embodiment, to the inner peripheral side of the aperture portions 104, the moveable film 92 is disposed covering the apertures of the aperture portions 104 on the inner peripheral side so that pressure of the liquid chamber 36b will be exerted on the moveable film 92 through the aperture portions 104. The orifice member 98 of the present embodiment is produced by attaching the moveable film 92 to the orifice fitting 99.

As in the preceding second embodiment, the orifice member 98 having the above construction will be attached to the integrally vulcanization molded component 28 of the main rubber elastic body 16 so as to straddle the aperture of the pocket portion 30a in the circumferential direction, and a suspension bushing constructed according to the present embodiment will be produced by fastening the outer cylindrical member 14 fitted externally onto the integrally vulcanization molded component 28.

In the suspension mounting of the present embodiment, the outer cylindrical member 14 is juxtaposed in a fluidtight state against the outer peripheral face of the orifice member 98 so that the outer peripheral aperture of the slot 100 is covered fluidtightly by the outer cylindrical member 14, forming a low-frequency orifice passage 106 that doubles back in the circumferential direction and extends for a prescribed length. This low-frequency orifice passage 106 communicates at a first end with the liquid chamber 36a via a communicating hole 102, and at its other end with the liquid chamber 36b at the circumferential end face of the orifice member 98, and is tuned so as to produce the intended vibration-damping effect against principal input vibration in the low-frequency range.

The aperture portions 104 are formed in the lengthwise medial section of the low-frequency orifice passage 106 so that the medial section of the low-frequency orifice passage 106 communicates with the liquid chamber 36a. Thus, utilizing part of the low-frequency orifice passage 106, there is formed a high-frequency orifice passage 108. Specifically, the high-frequency orifice passage 108 communicates at a first end with the liquid chamber 36a via the aperture portions 104, while its other end opens onto the circumferential end face of the orifice member 98 and communicates with the liquid chamber 36b. Additionally, as depicted in FIG. 14, the high-frequency orifice passage 108 is formed utilizing the wide lowermost end part in the slot 100, thus giving it substantially larger passage cross sectional area as compared with the low-frequency orifice passage 106 that includes the narrow section; it also has shorter passage length. The high-frequency orifice passage 108 will thereby be tuned so as to produce the intended vibration-damping effect against vibration of a higher frequency range than the low-frequency orifice passage 106. In FIG. 14, the orifice passages 106, 108 produced by assembling the orifice member 98 to the integrally vulcanization molded component 28 and the outer cylindrical member 14 is shown.

In the suspension mounting constructed according to this embodiment, as in the first and second embodiments described previously, excellent vibration-damping effect can be achieved when vibration of either a low-frequency range or high-frequency range is input. Moreover, in the present embodiment, by employing a construction whereby part of the low-frequency orifice passage 106 is utilized to form the high-frequency orifice passage 108, the low-frequency orifice passage 106 and the high-frequency orifice passage 108 can be formed with good space efficiency, and the orifice member 98 can be made more compact. Additionally, orifice passages 106, 108 having prescribed passage length and passage cross sectional area can be formed efficiently.

The fact that fluid-filled cylindrical vibration-damping devices constructed according to the present invention afford effective vibration-damping action against both vibration of a low-frequency range and vibration of a high-frequency range is demonstrated by actual measurements.

Figure 15:
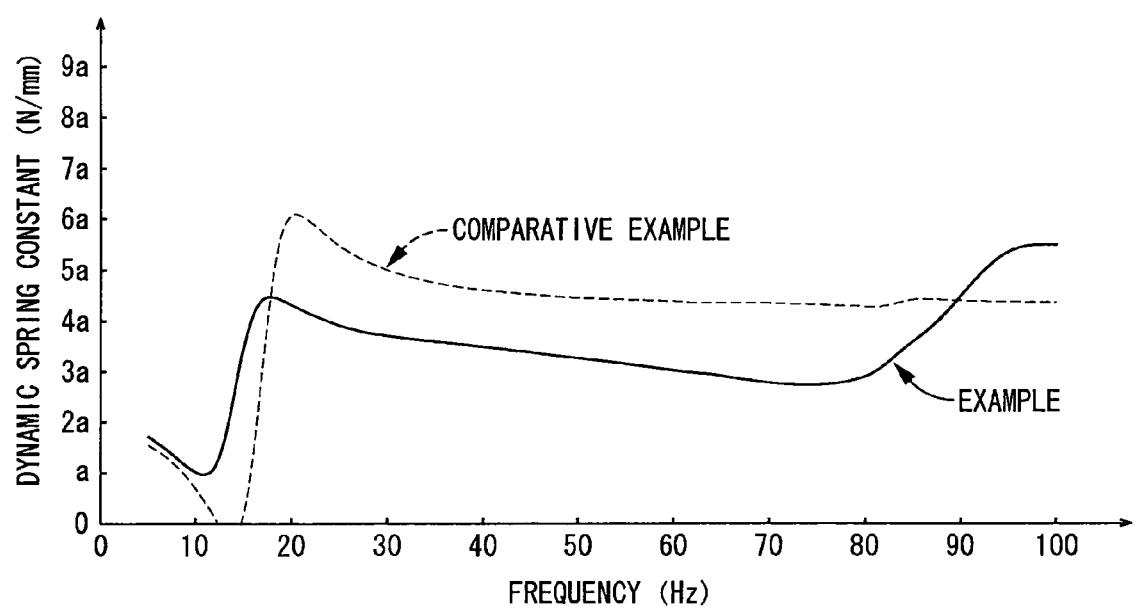
FIG. 15 is a graph demonstrating vibration damping characteristics of the fluid filled cylindrical vibration-damping device of the present invention.

As a specific example of vibration-damping characteristics of fluid-filled cylindrical vibration-damping devices according to the present invention, FIG. 15 shows vibration-damping characteristics of the suspension bushing 10 constructed according to the first embodiment, depicted in graph form plotting numerical values of dynamic spring constant versus frequency of input vibration. According to this graph, with the fluid-filled cylindrical vibration-damping device of the present invention, during input of low-frequency vibration on the order to several ten Hz, vibration-damping effect (high damping effect) is effectively produced by fluid flow through the low-frequency orifice passage, while during input of high-frequency vibration on the order of 70 Hz to 80 Hz, vibration-damping effect (low dynamic spring effect) is effectively produced by fluid flow through the high-frequency orifice passage 72. FIG. 15 further shows that dynamic spring constant is held to a small value during input of vibration in a medium-frequency range, and that vibration-damping effect based on liquid pressure-absorbing action of the moveable film 60 is exhibited effectively against vibrations over a wide frequency range to attain a broader of vibration-damping capability. In FIG. 15, measurements for the fluid-filled cylindrical vibration-damping device according to the present invention shown as an Example are indicated by the solid line, while measurements for a fluid-filled cylindrical vibration-damping device of conventional construction (i.e. fluid-filled cylindrical vibration-damping device lacking a high-frequency orifice passage) shown as a Comparative Example are indicated by the broken line.

While the present invention has been shown hereinabove in terms of certain preferred embodiments, these are merely illustrative and should in no wise be construed as limiting the invention to the specific disclosure herein.

For example, the moveable film in the preceding first to third embodiments is shown as having a moveable film construction fastened at its outer peripheral edge part to the orifice member; however, it would be acceptable for the moveable film to have a moveable plate construction designed to allow to undergo minute displacements in the thickness direction so as to produce liquid pressure-absorbing action by these minute displacements while limiting the amount of displacement in the thickness direction, with the flow of fluid to either side of the moveable film being blocked under conditions of maximum displacement. Where such a moveable plate construction is employed, the moveable plate need not necessarily be made of a rubber elastic body, and could instead be made of rigid synthetic resin for example.

In the preceding first embodiment, the moveable film 60 is thinner in portions due to the presence of the narrow grooves 66 and therefore readily undergoes elastic deformation at times of input of large-amplitude vibration; however, by instead forming slits in the moveable film that pass through it in the thickness direction for example, at times of input of large-amplitude vibration the slits could be induced to open up through elastic deformation of the moveable film. As a specific example, by forming a plurality of straightly slits extending radially out from the diametrical center section of a moveable film of generally circular disk shape, it would be possible to produce a structure whose diametrical center section is openable. With such a design, the two sides of the moveable film may be placed in communication through the slits, and at times of input of large jarring load development of extremely high spring can be prevented, while also avoiding noise caused by cavitation. In the stationary state, the slits may assume a sealed state as the sides to either side of the slits are placed in contact one another, or remain open to a slight extent such that fluid flow through the slits does not pose any problems in terms of vibration-damping characteristics.

The method of attaching the moveable film 60, 92 to the orifice member 38, 76 shown in the first to third embodiments above is merely exemplary, and is not limited in any particular way. Particularly where the orifice member is made of rigid synthetic resin, it will be preferable for the moveable film to be retained within the housing space by attaching a fastening member that covers the aperture of the housing recess, using means such as welding.

In the preceding first to third embodiments, the high-frequency orifice passage 72, 96, 108 provided as the high-frequency orifice passage opens into and communicates at both ends with the fluid chambers 36a, 36b. However, in another exemplary design, an additional medial aperture is formed in the lengthwise medial section of the high-frequency orifice passage to provide an ultra-high-frequency orifice passage exhibiting vibration-damping action against vibration of higher frequency than the high-frequency orifice passage. By disposing in this medial aperture a second moveable film that is tuned to a higher frequency than the moveable film disposed in the aperture section of the high-frequency orifice passage, it will be possible to attain vibration-damping effect against vibration of higher frequencies, while ensuring sufficient fluid flow through the high-frequency orifice passage.

The low-frequency and high-frequency orifice passages may have passage length, passage cross sectional area etc. established according to the vibration-damping characteristics required of them, and their construction is not limited to the specific constructions shown in the preceding first to third embodiments. Nor is the construction of the orifice member limited to the constructions shown in the preceding embodiments.

In the first to third embodiments above, a suspension bushing is shown by way of example of the fluid-filled cylindrical vibration-damping device according to the present invention; however, the present invention is adaptable to fluid-filled cylindrical vibration-damping device other than suspension bushings.

The present invention is not limited to fluid filled cylindrical vibration damping devices for automotive use, and is adaptable also to fluid filled vibration tubular damping devices for use in train cars or other applications.

It is also to be understood that the present invention may be embodied with various other changes, modifications and improvements, which may occur to those skilled in the art, without departing from the spirit and scope of the invention defined in the following claims.

What is claimed is:

1. A fluid-filled cylindrical vibration-damping device comprising:
an intermediate cylinder member disposed about an outer peripheral side of an inner shaft member, while being linked with the inner shaft member by a main rubber elastic body;
a pair of pocket portions provided to the main rubber elastic body and situated to either diametrical side of the inner shaft member, while respectively opening onto an outer peripheral face through window portions provided in the intermediate cylinder member; an outer cylindrical member affixed externally onto the intermediate cylinder member while covering the pair of pocket portions thereby defining a pair of fluid chambers filled with a non-compressible fluid; and an orifice member disposed extending in a circumferential direction along an inner peripheral face of the outer cylindrical member to form orifice passages extending in the circumferential direction between the orifice member and the outer cylindrical member, wherein:

base wall portions of either of the pair of pocket portions are constituted by the main rubber elastic body so as to actively give rise to opposing positive/negative pressure fluctuations in the pair of fluid chambers at times of vibration input across the inner shaft member and the outer cylindrical member in an axis-perpendicular direction;

the orifice passages includes a low-frequency orifice passage tuned to a low-frequency range and a high-frequency orifice passage tuned to a high-frequency range; and the high-frequency orifice passage is provided in an aperture section thereof leading to at least one of the pair of fluid chambers with a moveable film adapted to limit fluid flow through the high-frequency orifice passage on the basis of deformation thereof.

2. The fluid-filled cylindrical vibration-damping device according to claim 1, wherein the moveable film is disposed in the aperture section leading from the high-frequency orifice passage to the pair of fluid chambers.

3. The fluid-filled cylindrical vibration-damping device according to claim 1, wherein an integrally vulcanization-molded component that incorporates the inner shaft member and the intermediate cylinder member linked together by the main rubber elastic body is provided with a pair of half orifice bodies respectively having half circular tube shape and assembled from either side with respect to a diametrical axis along which the pair of pocket portions are situated in opposition by assembling the pair of half orifice bodies so as to link the apertures of the pair of pocket portions, thereby defining the orifice member of round tubular shape extending in the circumferential direction along the inner peripheral face of the outer cylindrical member; and slots provided on an outer peripheral face of the orifice member and extending in the circumferential direction are covered by the outer cylindrical member in order to define the low-frequency orifice passage and the high-frequency orifice passage.

4. The fluid-filled cylindrical vibration-damping device according to claim 1, wherein a first lengthwise end of the low-frequency orifice passage opens into and communicates with one of the pair of fluid chambers, while another lengthwise end of the low-frequency orifice passage opens into and communicates with the other of the pair of fluid chambers; a first medial aperture portion that opens into one of the pair of fluid chambers and a second medial aperture portion that opens into the other of the pair of fluid chambers are formed in a lengthwise medial section of the low-frequency orifice passage, and the moveable film is disposed in the first medial aperture portion and the second medial aperture portion, thereby utilizing a zone that extends between the first medial aperture portion and the second medial aperture portion in the medial section of the low-frequency orifice passage to define the high-frequency orifice passage.

5. The fluid-filled cylindrical vibration-damping device according to claim 1, wherein a first lengthwise end of the low-frequency orifice passage opens into and communicates with one of the pair of fluid chambers, while another lengthwise end of the low-frequency orifice passage opens into and communicates with the other of the pair of fluid chambers; and a medial aperture portion that opens into one of the pair of fluid chambers is formed in a lengthwise medial section of the low-frequency orifice passage, with the moveable film disposed in the medial aperture portion, thereby utilizing the low-frequency orifice passage in part to define the high-frequency orifice passage.

6. The fluid-filled cylindrical vibration-damping device according to claim 1, wherein the low-frequency orifice passage and the high-frequency orifice passage are independent passages formed in parallel; and a medial aperture portion that opens into one of the pair of fluid chambers is formed in a lengthwise medial section of the high-frequency orifice passage, with the moveable film disposed in the medial aperture portion.

7. The fluid-filled cylindrical vibration-damping device according to claim 1, wherein the moveable film has a diametrical center section that becomes progressively thinner towards a center so that two faces of the diametrical center section of the moveable film are defined as sloping faces of tapered shape.

8. The fluid-filled cylindrical vibration-damping device according to claim 7, wherein the moveable film has narrow grooves extending radially from the center to an outer peripheral side in a diametrical direction, with the moveable film being thinner in sections where the narrow grooves are formed than in other sections.

* * * * *